(12) United States Patent
Verdonk

(10) Patent No.: US 6,278,874 B1
(45) Date of Patent: Aug. 21, 2001

(54) WIRELESS COMMUNICATION SYSTEM IN WHICH A TERMINATION ACCESS TYPE IS IDENTIFIED TO A SERVING MOBILE SWITCHING CENTER

(75) Inventor: Timothy C. Verdonk, Redmond, WA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/223,892

(22) Filed: Dec. 31, 1998

(51) Int. Cl.[7] ................................................... H04M 11/00
(52) U.S. Cl. ............................ 455/408; 455/433; 455/445
(58) Field of Search ..................................... 455/433, 422, 455/445, 408, 406; 379/114, 111, 112, 113, 120, 121; 445/405

(56) References Cited

U.S. PATENT DOCUMENTS

| 5,479,484 | * | 12/1995 | Mukerjee et al. | 379/60 |
|---|---|---|---|---|
| 5,797,096 | * | 8/1998 | Lupien et al. | 455/433 |
| 5,835,856 | * | 11/1999 | Patel | 455/406 |
| 5,857,153 | * | 1/1999 | Lupien | 455/422 |
| 5,873,030 | * | 2/1999 | Mechling et al. | 455/408 |
| 5,978,678 | * | 11/1999 | Houde et al. | 455/433 |

* cited by examiner

Primary Examiner—Dwayne Bost
Assistant Examiner—Quochien B. Vuong
(74) Attorney, Agent, or Firm—Bruce Garlick; James Harrison

(57) ABSTRACT

A wireless communication system constructed according to the present invention forwards the termination access type to the serving mobile switching center (MSC) for inclusion into a call detail record and includes an originating MSC, a home location register (HLR), a serving MSC and supporting infrastructure for each MSC. Such supporting infrastructure includes a plurality of base station controllers (BSC) and a plurality of base stations. The base stations support wireless communications within respective cells to service mobile units operating in the cells. When a call is received by the originating MSC intended for the mobile unit, the originating MSC determines the termination access type of the call, e.g., mobile to mobile directory number access, land to mobile directory number access, remote feature control port access and roamer port access, among others. The originating MSC then sends a locate request to the mobile unit's HLR. The HLR then sends a route request to the serving MSC, such route request including the termination access type for the call. The originating MSC and the serving MSC then complete the call to the mobile unit. Once the call is completed, the serving MSC creates a call detail record (CDR) for the call, the CDR including the call duration, caller identity, mobile unit identity and such other information that is required to create a bill for the mobile unit.

21 Claims, 5 Drawing Sheets

WIRELESS COMMUNICATION SYSTEM IN WHICH A TERMINATION ACCESS TYPE IS IDENTIFIED TO A SERVING MOBILE SWITCHING CENTER

BACKGROUND

1. Technical Field

The present invention relates generally to wireless communication systems; and more particularly to a wireless communication system in which a mobile switching center that serves a mobile unit is apprised of the termination access type of a call delivered to the mobile unit, the serving mobile switching center generating a call detail record for the call which includes the termination access type, the mobile unit, the duration of the call and additional information, the call detail record later used to generate a bill for the subscriber of the mobile unit.

2. Related Art

Cellular wireless communication systems are generally known in the art to facilitate wireless communications within respective service coverage areas. Such wireless communication systems include a "network infrastructure" that facilitates the wireless communications with mobile units operating within a service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC) which also couples to the PSTN, the Internet and/or to other MSCs.

A wireless mobile unit operating within the service coverage area communicates with one or more of the base stations. The base stations route the communications to the MSC via a serving BSC. The MSC routes the communications to another subscribing wireless unit via a BSC/base station path (which may be the same BSC/base station path when the communications are with another subscribing unit serviced by the same base station) or via the PSTN/Internet/ other network to terminating destination.

Various operating standards have been developed to standardize wireless communications. The wireless communication operating standards include, for example, the Advanced Mobile Phone Service (AMPS) standards, the Global Standards for Mobility (GSM), the Code Division Multiple Access (CDMA) and the Time Division Multiple Access (TDMA) standards. A standard that is employed in North America for interconnectivity of MSCs is the IS-41 standard. These operating standards set forth the technical requirements that facilitate compatible operation between equipment of differing vendors.

In a cellular wireless communication system, each MSC is operated by a particular service provider and services communications over a fairly large geographic area. A large number of mobile units are serviced by this MSC. Each MSC serves as a home or "originating MSC" for a number of mobile units. The mobile units are assigned a permanent telephone number that, when routed via the PSTN, reaches the originating MSC. The originating MSC then performs call routing in an attempt to deliver the call to the mobile unit. As part of call routing, the originating MSC accesses the Home Location Register (HLR) servicing the mobile unit. The HLR provides the identity of a MSC currently serving the mobile unit (the "serving MSC").

If the mobile unit is operating with the coverage area of a base station supported by the originating MSC, the originating MSC is also the serving MSC. In such case, the originating MSC initiates a page to the mobile unit, the mobile unit responds to the page, and the call is completed. However, if the mobile unit is not being served by the originating MSC, but instead is being served by another MSC, a serving MSC, inter MSC operation is initiated. In such case, the originating MSC sends a locate request to a HLR servicing the mobile unit. In response, the HLR sends a route request to the serving MSC. Subsequently, the call is routed through the serving MSC to the mobile unit. Such operation is often referred to as call termination while "roaming".

While such seamless operation is greatly appreciated by the subscribers, many difficulties arise from these roaming operations. One such problem relates to billing procedures. Bills are generated for the subscriber of the mobile unit by its service provider (who operates the originating MSC). These bills are typically generated based upon call detail records (CDRs) generated by the originating MSC that identify the mobile unit and its call duration. However, when the mobile unit is roaming such that it is served by another MSC (the serving MSC), a CDR is generated by the serving MSC as well. The CDR created by the serving MSC identifies the mobile unit, the caller and the call duration. However, in many billing plans offered by service providers, the billing structure requires substantial additional information. This information is not included in the CDR of the serving MSC. Thus, an accurate bill may not be produced without cross-referencing the CDRs produced in the originating MSC with CDRs produced in the serving MSC.

Thus, there is a need in the art for a wireless communication system in which billing can be generated based upon the information collected and stored by a serving MSC that services a roaming mobile unit.

SUMMARY OF THE INVENTION

Thus, to overcome the shortcomings of the prior systems, among other shortcomings, a wireless communication system constructed according to the present invention forwards the termination access type to the serving mobile switching center (MSC) for inclusion into a call detail record. The wireless communication system includes an originating MSC, a home location register (HLR), a serving MSC and supporting infrastructure for each MSC. Such supporting infrastructure includes a plurality of base station controllers (BSC) and a plurality of base stations. The base stations support wireless communications within respective cells to service mobile units operating in the cells.

When a call is received by the originating MSC intended for the mobile unit, the originating MSC determines the termination access type of the call, e.g., mobile to mobile directory number access, land to mobile directory number access, remote feature control port access and roamer port access, among others. The originating MSC then sends a locate request to the mobile unit's HLR. The HLR then sends a route request to the serving MSC, such route request including the termination access type for the call. The originating MSC and the serving MSC then complete the call to the mobile unit.

Once the call is completed, the serving MSC creates a call detail record (CDR) for the call, the CDR including the call duration, caller identity, mobile unit identity and such other information that is required to create a bill for the mobile unit. However, according to the present invention, the CDR also includes the termination access type of the call. Thus, billing for the mobile unit may subsequently be completed, such billing requiring the termination access type to properly charge for the call.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
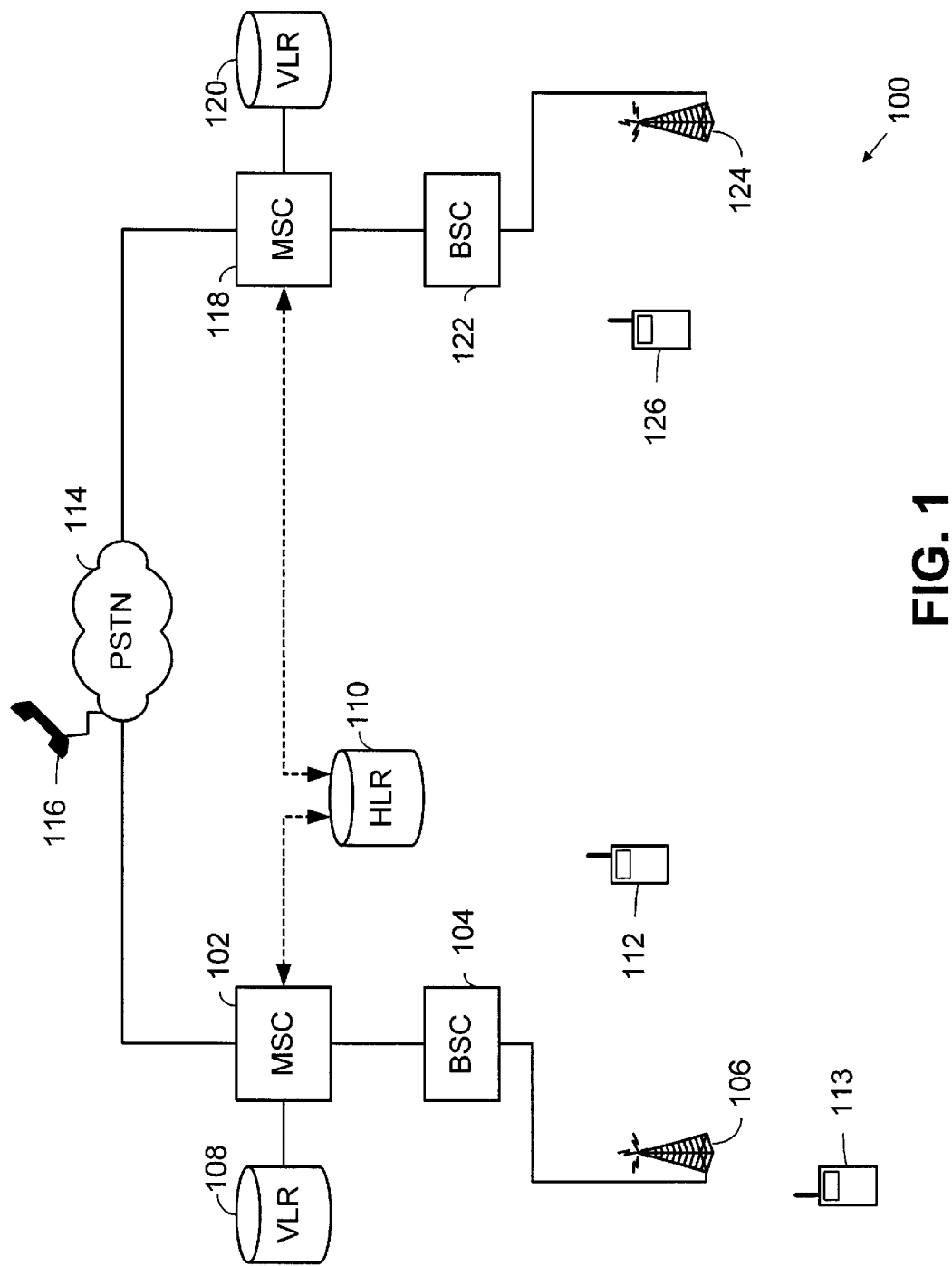
FIG. 1 is a system diagram illustrating generally the structure of a wireless communication system constructed according to the present invention serving a mobile unit.

FIG. 1 is a system diagram illustrating generally the structure of a wireless communication system constructed according to the present invention serving a plurality of mobile units 112, 113, and 126. The wireless communication system 100 includes mobile switching centers (MSCs) 102 and 118. Coupled to each MSC 102 and 118 is at least one base station controller (BSC). For example, BSC 104 is shown to be coupled to MSC 102 while BSC 122 is shown to be coupled to MSC 118. Finally, at least one base station couples to each BSC. As shown, base station 106 couples to BSC 104 while base station 124 couples to BSC 122. The construction of cellular based wireless communication systems is generally known. Thus, the structure of such cellular wireless communication systems will not be discussed other than to explain the teachings of the present invention. However, in a typical cellular wireless communication system, a plurality of base stations couple to each BSC and a plurality of BSCs couple to each MSC.

Each of the MSCs 102 and 118 is serviced by a visitor location register (VLR) 108 and 120, respectively. Further, each of the MSCs 102 and 118 couples to a home location register (HLR) 110 which stores subscriber information. The construction of VLRs and HLRs is also generally known. Thus, the operation of the VLRs and HLRs will not be discussed herein except as it applies to operation according to the present invention. A signaling path between the MSCs 102 and 118 and the HLR 110 is shown as a dotted line while the traffic path between the MSCs 102 and 118 and the PSTN 114 is shown as a solid line. Communications between the MSCs 102 and 118 and the HLR may be compliant with the IS-41 standard promulgated for North American intersystem operations.

Each of the MSCs 102 and 118 also couples to the public switched telephone network (PSTN) 114. The MSCs 102 and 118 may also couple to other communication networks as well, such as the Internet. The wireless communication system 100 services calls between terminals, e.g., 116, coupled to the PSTN 114 and mobile units, e.g., 112, 113 and 126. In an example of such call servicing, a call is placed at the terminal 112 coupled to the PSTN 114 and completed to the mobile unit 112 serviced by base station 112.

The wireless communication system 100 also services calls between mobile units 112, 113 and 126 serviced by the wireless communication system 100. For example, mobile unit 112 may initiate a call to mobile unit 126. In such case, the wireless communication system 100 routes the call via base station 106, BSC 104, MSC 102, the PSTN 114, MSC 118, BSC 122 and base station 124. In another example, mobile unit 113 initiates a call to mobile unit 112. In such case, the wireless communication system 100 routes the call via base station 106, BSC 104, MSC 102, BSC 104 and base station 106. Thus, in the latter case, as opposed to the former example, the call is serviced by MSC 102. In the former case, the call is serviced by MSC 102 and MSC 118.

The wireless communication system 100 may be operated by multiple system operators. For example, in one operation, a first system operator operates MSC 102 and all network infrastructure supported by MSC 102 while a second system operator operates MSC 118 and all network infrastructure supported by MSC 118. In such case, intersystem operations are required to service communications between mobile unit 112 and mobile unit 126, for example.

In an operation according to the present invention, MSC 102 is the originating MSC for mobile unit 126. In such case, a call intended for the mobile unit 126 initiated by terminal 116 is routed by the PSTN 114 to the MSC 102. Upon receipt of the call, the MSC 102 sends a locate request to the HLR 110 (which serves the mobile unit 126 that is currently roaming in the service area of MSC 118). According to the present invention, the termination access type is also sent to the HLR 110 in the locate request. Examples of termination access types include mobile to mobile directory number access, land to mobile directory number access (the current example), remote feature control port access, roamer port access and other termination access types. The serving MSC 120, originating MSC 102 and other components in the call routing path operate to setup and service the call.

Further, the serving MSC 120 creates a call detail record (CDR) for the mobile unit 126 for the call that includes the termination access type. Subsequently, the subscriber of the mobile unit 126 is billed based upon the termination access type as well as the call duration and other parameters.

In another example of operation, mobile unit 113 is roaming within a service area serviced by MSC 102 and initiates a call to mobile unit 112. When initiating the call to mobile unit 112 (serviced by MSC 102), the mobile unit 113 accesses a roamer access port serviced by MSC 102 requesting call delivery to mobile unit 112. The MSC 102 sends a locate request to the HLR 110, such locate request including the termination access type (roamer port access) The HLR 110 then sends a route request to the MSC 102 which serves mobile unit 112. The call is completed and a CDR is made for the mobile unit 112 (as well as the mobile unit 113).

In still another example, mobile unit 112 initiates a call to mobile unit 126. When initiating the call to mobile unit 126, the mobile unit 112 sends a request to setup the call to its serving MSC 102. The MSC 102 sends a locate request to the HLR 110, such locate request including the termination access type (mobile to mobile directory number access). The HLR 110 then sends a route request to the MSC 102 which serves mobile unit 112. The call is completed and a CDR is created for the mobile unit 112 by MSC 102 and a CDR is created for the mobile unit 126 by MSC 118 which includes the termination access type (mobile to mobile directory number access).

Figure 2:
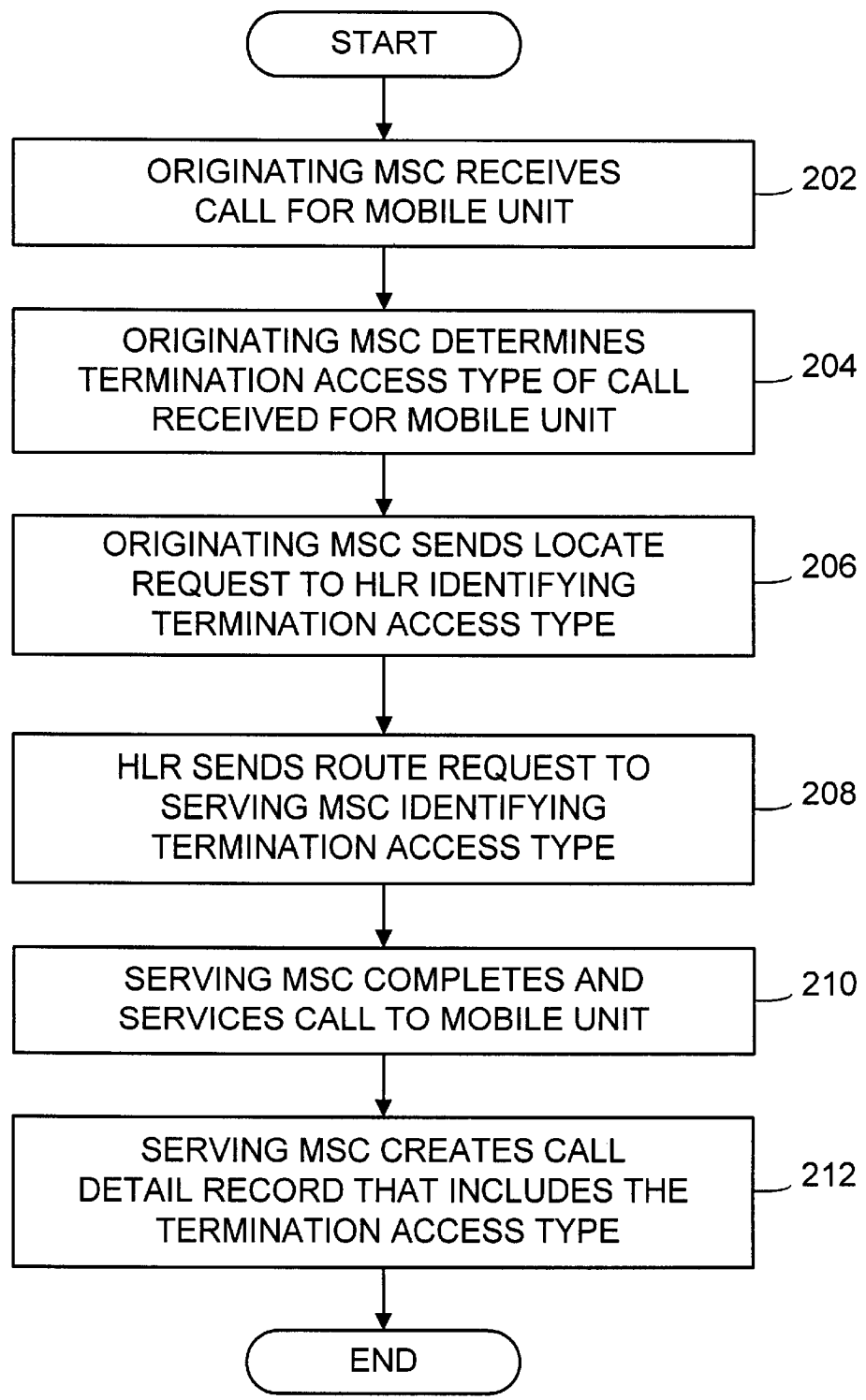
FIG. 2 is a logic diagram illustrating operation according to the present invention in which a serving mobile switching center creates a call detail record that includes the termination access type which is provided by an originating mobile switching center to the serving mobile switching center.

FIG. 2 is a logic diagram illustrating operation according to the present invention in which a serving mobile switching center creates a CDR for a mobile unit to which it terminates a call, the CDR that including the termination access type of a caller. Operation commences at step 302 wherein an originating MSC receives a request to connect a call to a mobile unit. The originating MSC then determines the termination access type of the call that was received for the mobile unit at step 204. Examples of such termination access types include mobile to mobile directory number access, land to mobile directory number access, remote feature control port access and roamer port access, for example. The originating MSC is able to determine the termination access type based upon how the call was received. If the call is received from the PSTN (or another coupled communication network), the originating MSC determines that the call is a land to mobile directory number access. If the call is received from a BSC that it services, the originating MSC determines that the call is a mobile to mobile directory number access. Further, if the call is received on a designated roamer access port, the originating MSC determines that the call is a roamer port access.

At step 206 the originating MSC sends a locate request to the HLR serving the mobile unit, such locate request identifying the termination access type. Then, at step 208, the HLR sends a route request to the serving MSC in which it identifies the termination access type. Operation proceeds to step 210 where the serving MSC completes the call to the mobile unit and services the call until call termination. Finally, at step 212, once the call has been terminated, the serving MSC creates a CDR based upon the termination access type, the duration of the serviced call for the destination mobile unit and additional information, the calling party, the facilities used and additional pertinent information. This CDR is later used by a billing system to create a bill for the mobile unit.

Figure 3:
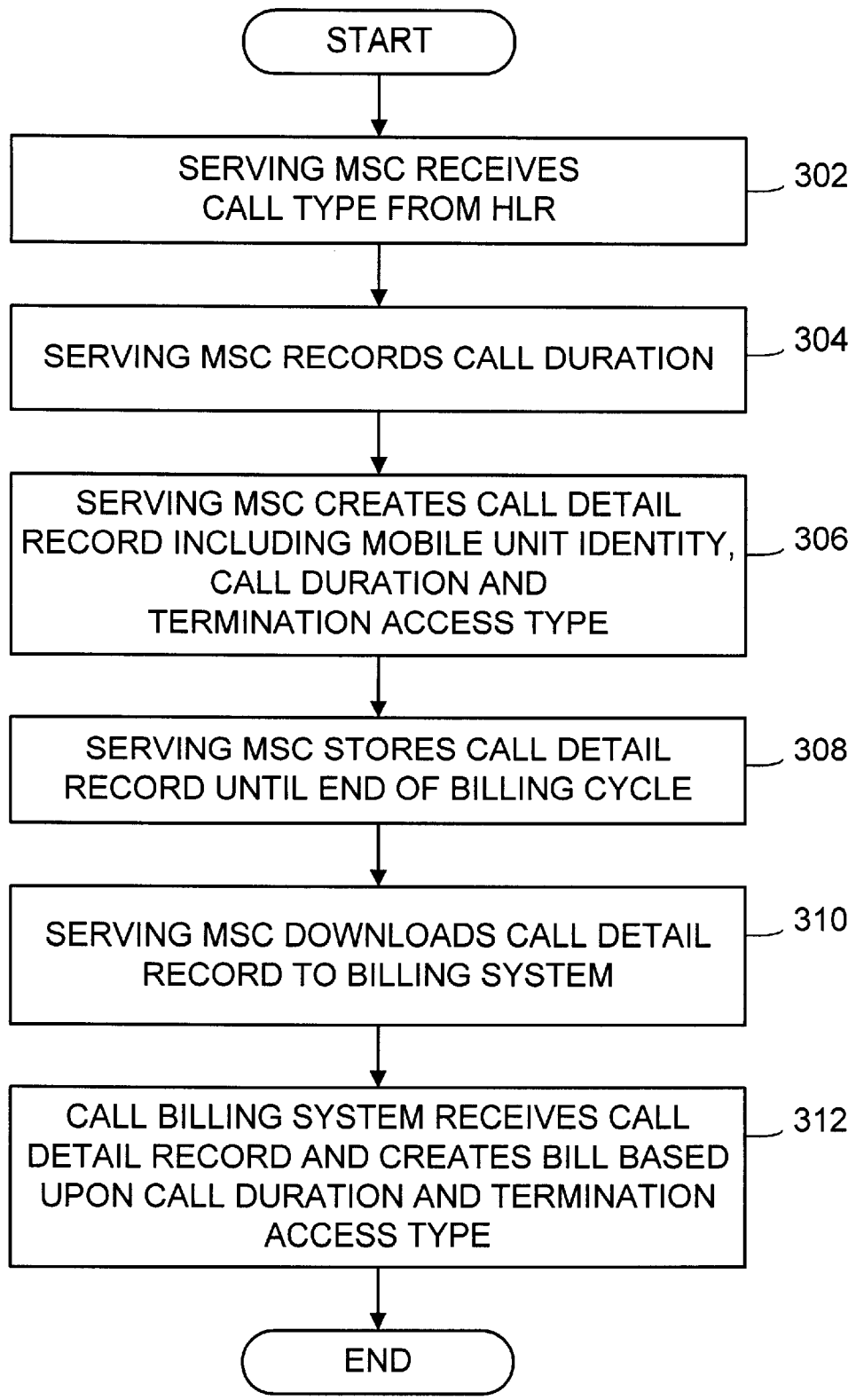
FIG. 3 is a logic diagram illustrating operation of a serving MSC according to the present invention in creating a call detail record that includes the termination access type of a call routed by the serving mobile switching center to a mobile unit.

FIG. 3 is a logic diagram illustrating operation of a serving MSC according to the present invention in creating a call detail record that includes the termination access type of a call routed by the serving mobile switching center to a mobile unit. Operation commences at step 302 where the serving MSC receives the termination access type from the HLR in a route request. From step 302, operation proceeds to step 304 where the serving MSC records the call duration for the call being serviced. Then, at step 306, the serving MSC creates a CDR that includes the mobile unit identity, the call duration and the termination access type.

From step 306, operation proceeds to step 308 where the serving MSC stores the CDR until the end of the billing cycle. At the end of the billing cycles, the serving MSC downloads the CDR to the billing system at step 310. Then, at step 312, the billing system receives the CDR from the serving MSC and creates a bill for the subscriber operating the mobile unit, such bill including a bill component based upon the call duration and termination access type identified in the CDR. Note that the charges for the particular calls identified in the CDR may be dependent upon the termination access type contained in the CDR. For example, calls of a roamer port access termination access type may be charged only based upon the call duration and not include roaming charges.

Figure 4A:
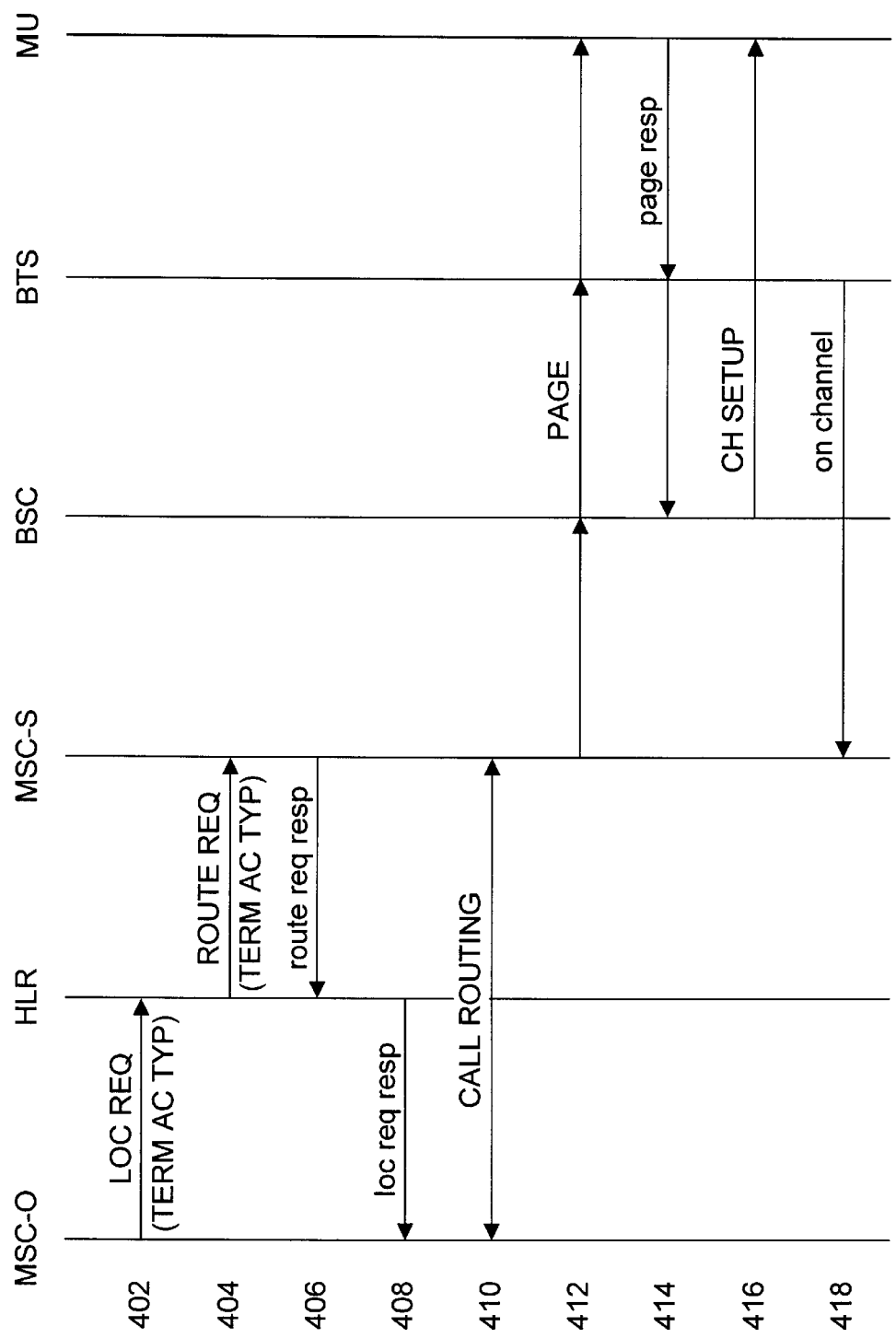
FIGS. 4A and 4B are message flow diagrams illustrating the flow of messages among an originating mobile switching center, a home location register, a serving mobile switching center, a base station controller, a base station and a mobile unit according to the present invention in receiving and routing a call.
Figure 4B:
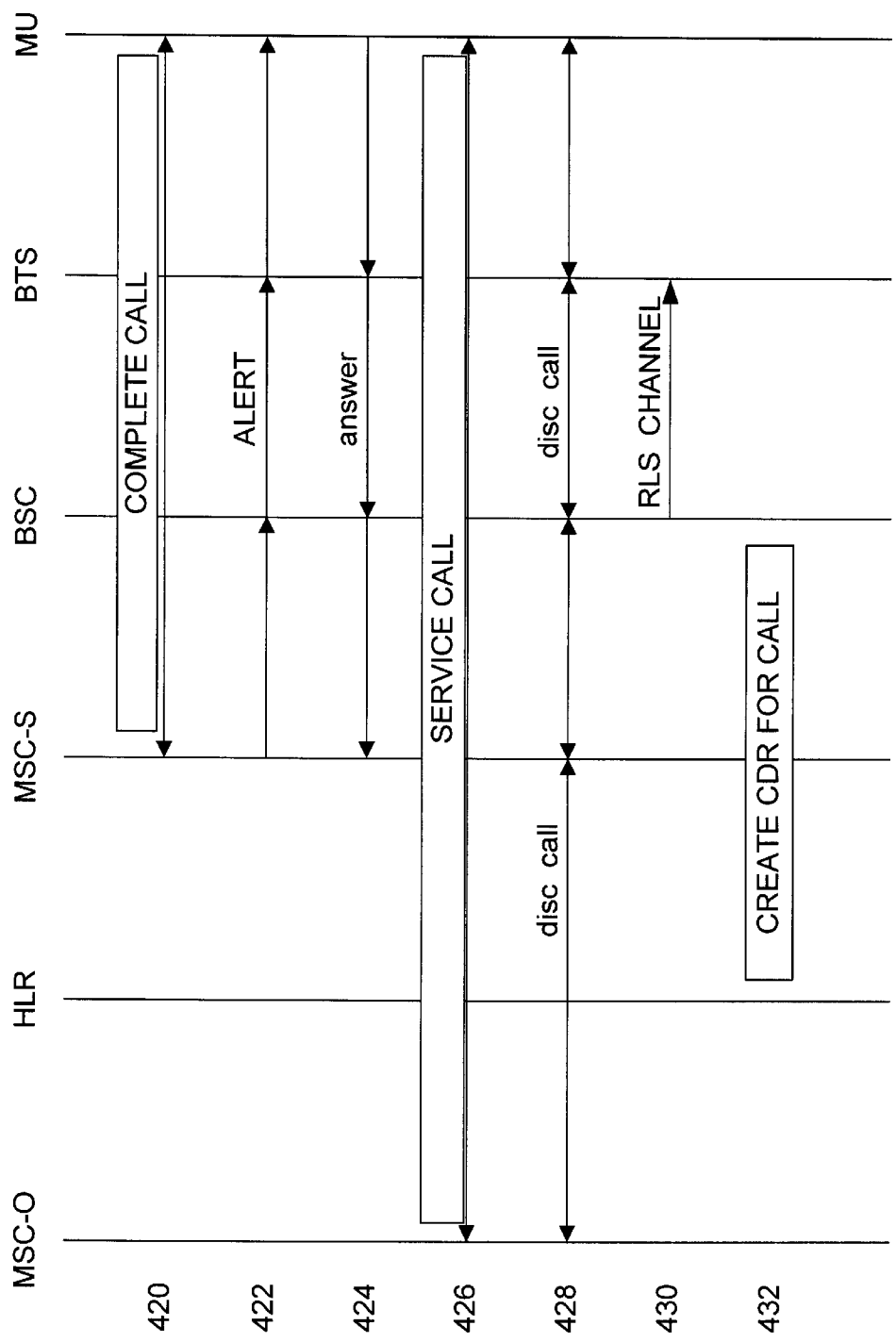

FIGS. 4A and 4B are message flow diagrams illustrating the flow of messages among an originating mobile switching center, a home location register, a serving mobile switching center, a base station controller, a base station and a mobile unit according to the present invention in receiving and routing a call. At 402, the originating MSC has received a request to terminate a call to a mobile unit based upon a call request and, in response, sends a locate request to a serving HLR. The locate request sent at 402 includes the termination access type for the call, e.g., mobile to mobile directory number access, land to mobile directory number access, etc.

The HLR then sends a route request to the serving MSC which includes the termination access type at 404. As is generally known, the last known location of the mobile unit is kept in the HLR and accessed in response to the locate request. This access determines the identity of the serving MSC. In response, at 406, the serving MSC responds to the HLR with a route request response. The HLR then sends a locate request response to the originating MSC at 408, such locate request response identifying the serving MSC to the originating MSC.

At 410, the originating MSC and the serving MSC perform call routing to service the call. The serving MSC then sends a page to the mobile unit via at least one BSC and at least one base station transceiving subsystem (BTS) at 412. At 414, the mobile unit responds to the page with a page response. Such page response is relayed via a servicing BTS to a servicing BSC. The servicing BSC then coordinates the allocation and setup of a channel to the mobile unit at 416. Subsequently, the servicing BTS sends an on channel message to the serving MSC via the servicing BSC at 418.

Referring now to FIG. 4B, the serving MSC completes the call to the mobile unit at 420. Then, the serving MSC sends an alert to the mobile unit via the servicing BSC and servicing BTS at 422, such alert signal causing the mobile unit to ring. The user of the mobile unit may answer the alert to the serving MSC at 424 via the servicing BTS and the servicing BSC by accepting the call. Once these steps are complete, the call is serviced at 426 until either the mobile unit or the originating party disconnects.

At 428, either the mobile unit or the originating party initiates disconnection of the call. Then, at step 430, the servicing BSC initiates the release of the channel at 430. Once the call has been completed, the serving MSC creates a CDR for the mobile unit at 432, the CDR including the identity of the mobile unit, the termination access type, the call duration and additional required information.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method of operating a wireless communication system that includes an originating mobile switching center, a home location register and a serving mobile switching center, the method comprising:

receiving a call at the originating mobile switching center from an originating terminal, the call intended for a mobile unit serviced by the wireless communication system;

determining the termination access type of the call;

sending a locate request to the home location register for the mobile unit, the locate request including the termination access type;

the home location register sending a route request to the serving mobile switching center for the mobile unit, the route request including the termination access type;

the originating mobile switching center and the serving mobile switching center servicing the call; and the serving mobile switching center creating a call detail record that includes the termination access type.

2. The method of claim 1, wherein:

the call is received from the originating terminal via a communication network coupled to the originating mobile switching center; and the termination access type is a land to mobile directory number access.

3. The method of claim 1, wherein:

the originating terminal is another mobile unit serviced by the wireless communication system; and the termination access type is a mobile to mobile directory number access.

4. The method of claim 1, wherein:

the call is received by the originating mobile switching center via a roamer access port; and the termination access type is a roamer port access.

5. The method of claim 1, wherein the call is serviced via a base station controller and a base station coupled to the serving mobile switching center.

6. The method of claim 1, wherein the call detail record further includes the identity of the mobile unit, the identity of the originating terminal and a call duration.

7. The method of claim 6, further comprising creating a cellular telephone bill for the mobile unit based partially upon the termination access type contained in the call detail record.

8. A method of operating an originating mobile switching center and a home location register in conjunction with a serving mobile switching center, the method comprising:

receiving a call at the originating mobile switching center from an originating terminal, the call intended for a mobile unit serviced by the wireless communication system;

determining the termination access type of the call;

sending a locate request to the home location register for the mobile unit, the locate request including the termination access type;

the home location register sending a route request to the serving mobile switching center for the mobile unit, the route request including the termination access type;

the originating mobile switching center operating in conjunction with the serving mobile switching center to service the call.

9. The method of claim 8, wherein:

the call is received from the originating terminal via a communication network coupled to the originating mobile switching center; and the termination access type is a land to mobile directory number access.

10. The method of claim 8, wherein:

the originating terminal is another mobile unit serviced by the wireless communication system; and the termination access type is a mobile to mobile directory number access.

11. The method of claim 8, wherein:

the call is received by the originating mobile switching center via a roamer access port; and the termination access type is a roamer port access.

12. A wireless communication system for operating in conjunction with a serving mobile switching center, the wireless communication system comprising:

an originating mobile switching center that receives a call from an originating terminal, the call intended for a mobile unit serviced by the wireless communication system;

a home location register coupled to the originating mobile switching center;

the originating mobile switching center determining the termination access type of the call and sending a locate request to the home location register for the mobile unit, the locate request including the termination access type;

the home location register sending a route request to the serving mobile switching center for the mobile unit, the route request including the termination access type;

the originating mobile switching center operating in conjunction with the serving mobile switching center to service the call.

13. The wireless communication system of claim 12, wherein:

the call is received from the originating terminal via a communication network coupled to the originating mobile switching center; and the termination access type is a land to mobile directory number access.

14. The wireless communication system of claim 12, wherein:

the originating terminal is another mobile unit serviced by the wireless communication system; and the termination access type is a mobile to mobile directory number access.

15. The wireless communication system of claim 12, wherein:

the call is received by the originating mobile switching center via a roamer access port; and the termination access type is a roamer port access.

16. A wireless communication system for servicing a mobile unit, the wireless communication system comprising:

an originating mobile switching center that receives a call from an originating terminal, the call intended for a mobile unit serviced by the wireless communication system;

a home location register coupled to the originating mobile switching center;

the originating mobile switching center determining the termination access type of the call and sending a locate request to the home location register for the mobile unit, the locate request including the termination access type;

a serving mobile switching center coupled to the home location register that services the mobile unit;

the home location register sending a route request to the serving mobile switching center for the mobile unit, the route request including the termination access type; and the originating mobile switching center operating in conjunction with the serving mobile switching center to service the call; and the serving mobile switching center creating a call detail record that includes the termination access type.

17. The wireless communication system of claim 16, wherein:

the call is received from the originating terminal via a communication network coupled to the originating mobile switching center; and the termination access type is a land to mobile directory number access.

18. The wireless communication system of claim 16, wherein:

the originating terminal is another mobile unit serviced by the wireless communication system; and the termination access type is a mobile to mobile directory number access.

19. The wireless communication system of claim 16, wherein:

the call is received by the originating mobile switching center via a roamer access port; and the termination access type is a roamer port access.

20. The wireless communication system of claim 16, wherein the call is serviced via a base station controller and a base station coupled to the serving mobile switching center.

21. The wireless communication system of claim 16, wherein the call detail record further includes the identity of the mobile unit, the identity of the originating terminal and a call duration.

* * * * *